United States Patent [19]

De Martino

[11] 4,007,301
[45] Feb. 8, 1977

[54] METHOD FOR PRECOATING A FILTER WITH A MIXTURE OF ANION AND CATION EXCHANGE RESIN PARTICLES

[75] Inventor: Roberto De Martino, Milan, Italy
[73] Assignee: Ecodyne Corporation, Chicago, Ill.
[22] Filed: July 29, 1974
[21] Appl. No.: 492,465
[52] U.S. Cl. .................................. 427/244; 210/75; 210/193; 260/2.1 R
[51] Int. Cl.² ........................ B01D 37/02; B05D 5/00
[58] Field of Search ..................... 117/98; 427/244; 210/75, 193, 24; 260/2.1 R

[56] References Cited

UNITED STATES PATENTS

| | | | |
|---|---|---|---|
| 2,961,417 | 11/1960 | Small | 260/2.1 |
| 3,250,703 | 5/1966 | Levendusky | 210/75 X |
| 3,250,704 | 5/1966 | Levendusky | 210/75 X |
| 3,250,705 | 5/1966 | Levendusky | 210/32 X |
| 3,262,891 | 7/1966 | Abrams | 260/2.1 |
| 3,339,743 | 9/1967 | Bealle | 210/24 X |
| 3,389,080 | 6/1968 | Arden | 210/75 X |
| 3,558,744 | 1/1971 | Michaels et al. | 210/37 X |
| 3,645,922 | 2/1972 | Weiss et al. | 260/2.1 R |
| 3,674,686 | 7/1972 | Brimmer et al. | 210/75 X |

Primary Examiner—Ronald H. Smith
Assistant Examiner—Stuart D. Frenkel
Attorney, Agent, or Firm—Hume, Clement, Brinks, Willian, Olds & Cook, Ltd.

[57] ABSTRACT

An improved method for precoating a filter with a mixture of anion and cation exchange resin particles in the size range of about 60 to 400 mesh is provided, wherein a floc of anion and cation exchange resins is formed by mixing these resins in aqueous suspension at elevated temperatures in the range of about 100° to 212° F. and coating these resins onto a filter.

6 Claims, No Drawings

METHOD FOR PRECOATING A FILTER WITH A MIXTURE OF ANION AND CATION EXCHANGE RESIN PARTICLES

The present invention relates to an improved method for precoating a filter with a mixture of anion and cation exchange resin particles.

In U.S. Pat. No. 3,250,703, issued May 10, 1966, and assigned to the assignee of this application, there is described a method and apparatus for removing impurities from liquids by passing these liquids through a filter screen that has been precoated with ion exchange resin particles in the size range of about 60 to 400 mesh. In U.S. Pat. No. 3,250,702, dated May 10, 1966, and assigned to the assignee of this application, there is described a method for purifying liquids by precoating such a filter screen with a mixture of both anion and cation exchange resin particles in the size range of about 60 to 400 mesh. Generally, this method is carried out by combining the two resins in aqueous suspension, causing the resins to agglomerate or "clump" with one another to form larger particles. Because of the formation of these larger particles, a greater void space is provided in a bed of finely divided resin particles so that there is less resistance to flow of liquid through the filter bed, and therefore a lower pressure drop across the filters. The "clumping" of the resins also produces a greater depth of filtration together with increased efficiency in removing suspended particles from the stream being filtered.

For a number of reasons, it is desirable to employ as high a ratio of cation to anion exchange resin as possible in carrying out the method described in the aforementioned patents. The primary reason for this is that the cation exchange resin is significantly less expensive than the anion exchange resin, and also has less of a tendency to degrade with age and exposure to heat. However, it has been found that, with freshly manufactured resin, the maximum ratio of cation to anion exchange resin that produces an acceptable level of clumping for use in the aforementioned method and apparatus is about 5 to 1 on a dry weight basis. Beyond this ratio, it has been found that a portion of the cation exchange resin does not clump, causing the pressure drop across the filter bed to become excessively high, so that the run length for the filter is shortened. As the resins age, it has been found that the proportion of cation exchange resin that can be employed is reduced even further.

Generally, the present invention relates to an improved method for precoating a filter with a mixture of anion and cation exchange resin particles in the size range of about 60 to 400 mesh. In carrying out the method, a floc of the resins is formed by mxing the anion and cation exchange resin particles in aqueous suspension at elevated temperatures of about 100° to 212° F., and then coating the resins onto a filter. When carrying out this method, the maximum ratio of cation to anion exchange resin is significantly increased, and this increase is particularly dramatic in the case of resins that have degraded because of aging.

More specifically, it has been found that complete clumping of anion and cation exchange resins at high cation: anion resin ratios may be produced by combining the resin particles in the size range of about 60 to 400 mesh in aqueous suspension at elevated temperatures of about 100° to 212° F. and preferably to the range of about 125° to 212° F. The production of complete clumping is observed by the absence of fines in the supernate above the clumped resin particles.

The clumping of anion and cation exchange resin particles is preferably carried out by combining the particles in aqueous suspension at a concentration of about 4% dry resin by weight, although this concentration is by no means critical. The volume of the clumped resin is then measured by the "V/V ratio," which is determined by withdrawing one liter of the suspension in a graduated cylinder, and observing the percent of the cylinder volume that is filled with resin. In general, an acceptable range is 40–70% resin volume/total volume of slurry. When complete clumping is produced, there is also an absence of cloudiness in the supernate above the clumped resin particles, indicating an absence of un-clumped particles or fines in aqueous suspension.

If an excessive V/V is produced, i.e., above 70%, the volume may be reduced in accordance with the method described in U.S. Pat. No. 3,250,704, dated May 10, 1966, which is assigned to the assignee of this application. In some instances, a V/V below the level referred to above is desired, i.e., when there is a very large concentration of iron oxides in the liquid stream being treated, so that a higher pressure drop is desired. However, in general, it is desired to maintain the V/V in the 40–70% range.

The method of the present invention is applicable to any of the typical ion exchange resin particles. Typical cation exchange resin particles which may be employed in the present invention are the divinylbenzene-styrene copolymer type, the acrylic type, the sulfonated coal type, and the phenolic type. These may be used in the sodium, hydrogen, ammonium, or hydrazine form, for example. Typical solid anion exchange resin particles that may be employed in the present invention are the phenol-formaldehyde type, the divinylbenzene-styrene copolymer type, the acrylic type, and the epoxy type. The anion resin particles may be used in the hydroxide or chloride form, for example. These anion and cation exchange resins are well known in the art in the large bead form, i.e., in the size range of 20–50 mesh. For example, such resins are sold in the large bead form under the trade names Amberlite IR-120 and IRA-400, sold by Rohm & Haas Co., and Dowex HCR-S and SBR-P, sold by the Dow Chemical Company. The finely divided resins employed in the present invention are made by reducing the size of these well known large bead resins to the desired range. The finely divided resin particles are regenerated and washed prior to use, as with large bead resin particles.

The filter screens to which the precoat is applied may be of any shape without departing from the spirit of the present invention, although cylindrical, wound filter elements are generally employed.

The following examples are intended to illustrate the present invention, and should not be construed as limitative.

EXAMPLE I

In the following series of tests, the maximum cation to anion exchange resin ratio that would produce complete clumping was determined, as evidenced by the presence of a clear supernate. In carrying out the tests, a total of about 4 grams of cation and anion exchange resins was employed. The tests were conducted in a 1-liter beaker equipped with a heater, a thermometer, and a mechanical stirrer. The anion exchange resin was first placed in suspension and stirred for 5 minutes, after which the cation exchange resin was added, followed by stirring for another 5 minutes. The suspension was allowed to stand for 10 minutes, and the supernate was observed for clarity. The maximum cation:anion exchange resin ratio was the highest ratio that produced a clear supernate.

The resins employed were about 180 days old, and, as indicated below, produced a clear supernate at a maximum cation:anion exchange ratio of only 3.8:1 on a dry weight basis at room temperature. The cation resin was a divinylbenzene-styrene copolymer type, having sulfonic acid active groups. The anion exchange resin employed was also of the divinylbenzene-styrene copolymer type, and having the quaternary ammonium active groups. The cation exchange resin was in the ammonium form and the anion exchange resin was in the hydroxide form.

| Water Temperature (° F.) | Maximum Cation:Anion Ratio |
|---|---|
| 70° | 3.8:1 |
| 100° | 4.8:1 |
| 125° | 5.9:1 |
| 155° | 8:1 |

As can be seen from the foregoing table, an increase in the temperature at which the anion and cation exchange resins are mixed produces a substantial increase in the maximum ratio of cation to anion exchange resin, enabling the economical formation of high-efficiency precoats.

A slurry of ion exchange resin particles prepared as above may be precoated onto a filter screen, such as a tubular wound nylon filter element, by simply recirculating the slurry through the element until the effluent stream is clear, according to methods that are well known in the art. Such methods are described, for example, in U.S. Pat. Nos. 3,250,703 and 3,373,104, which are assigned to the assignee of this application. Preferably, the filters are precoated by recirculating a slurry having a reduced resin concentration of about 0.5%.

EXAMPLE II

A second series of tests was conducted with cation and anion exchange resins of the same type as employed in Example I. In this instance, the cation exchange resin was about 2½ years old, while the anion exchange resin was about two months old. The cation exchange resin had therefore undergone a significant amount of age degradation, as indicated by the impossibility of forming a clear supernate at room temperature with a 3.9:1 cation:anion ratio.

As in Example I, the tests were conducted in a 1-liter beaker equipped with a heater, a thermometer, and a mechanical stirrer. The beaker contained about 700 ml of deionized water, and 17.2 grams of anion exchange resin and 67 grams of cation exchange resin were added. A clear supernate could not be produced at room temperature (71° F.).

The hot plate was turned on, and the liquid was heated slowly with stirring until the supernate was clear. This result was achieved at 160° F. Enough cation exchange resin was then added to produce a supernate which appeared to have a particle concentration of about 30 ppm. Slow heating was then continued until the supernate again became clear. This procedure was repeated until, above a temperature of 207° F., the production of bubbles in the water disrupted and agitated the resin so that a clear supernate could not be produced. The temperatures, together with the catio-manion exchange resin ratio (dry weight basis) that produced a clear supernate are shown in the following table:

| Water Temperature (° F.) | Cation:Anion Ratio |
|---|---|
| 160 | 3.9:1 |
| 167 | 5.0:1 |
| 180 | 6.3:1 |
| 184 | 7.0:1 |
| 189 | 7.7:1 |
| 195 | 8.1:1 |
| 207 | 8.5:1 |

After the foregoing series of tests was completed, the liquid was periodically agitated while being allowed to cool to room temperature. It was noted that the floc remained stable, as indicated by a clear supernate, down to a temperature of 87° F. Thus, a floc may be formed at high temperatures in accordance with the present invention and may then be precoated onto a filter without the floc becoming unstable during moderate temperature drops or during the filtration of liquids having a temperature only slightly above room temperature.

Obviously, many modifications and variations of the invention as hereinbefore set forth will occur to those skilled in the art, and it is intended to cover in the appended claims all such modifications and variations as fall within the true spirit and scope of the invention.

I claim:

1. A method for precoating a filter with a mixture of anion and cation exchange resin particles in the size range of about 60 to 400 mesh comprising: mixing said anion and cation exchange resins in aqueous suspension at a temperature of about 100° to 212° F., whereby to cause said resins to agglomerate with one another to form larger particles; and coating said resins onto a filter.

2. A method as defined in claim 1 wherein said temperature is about 125° to 212° F.

3. A method for precoating a filter with a mixture of anion and cation exchange resin particles in the size range of about 60 to 400 mesh comprising: mixing said anion and cation exchange resins in aqueous suspension at a temperature of about 100° to 212° F., the ratio of said cation exchange resin to said anion exchange resin being at least about 5:1 on a dry weight basis, whereby to cause said resins to agglomerate with one another to form larger particles; and coating said resins onto a filter.

4. The method as defined in claim 3 wherein said temperature is about 125°–212° F.

5. A method for precoating a filter with a mixture of anion and cation exchange resin particles comprising: mixing cation and anion exchange resin particles in aqueous suspension at a temperature of at least about 100°–212° F., said resin particles being in the size range of about 60–400 mesh, and said resins being of the styrene-divinylbenzene copolymer type, said cation exchange resin having sulfonic acid active groups and said anion exchange resin having quaternary ammonium active groups, the ratio of said cation exchange resin to said anion exchange resin being at least about 5:1 on a dry weight basis, whereby to cause said resins to agglomerate with one another to form larger particles; and coating said resins onto a filter.

6. The method as defined in claim 5 wherein said temperature is in the range of about 125°–200° F.

* * * * *